Nov. 18, 1952     L. W. VEZIE     2,618,389
SAFETY VALVE FOR COFFEE MAKERS
Filed April 16, 1948     2 SHEETS—SHEET 1
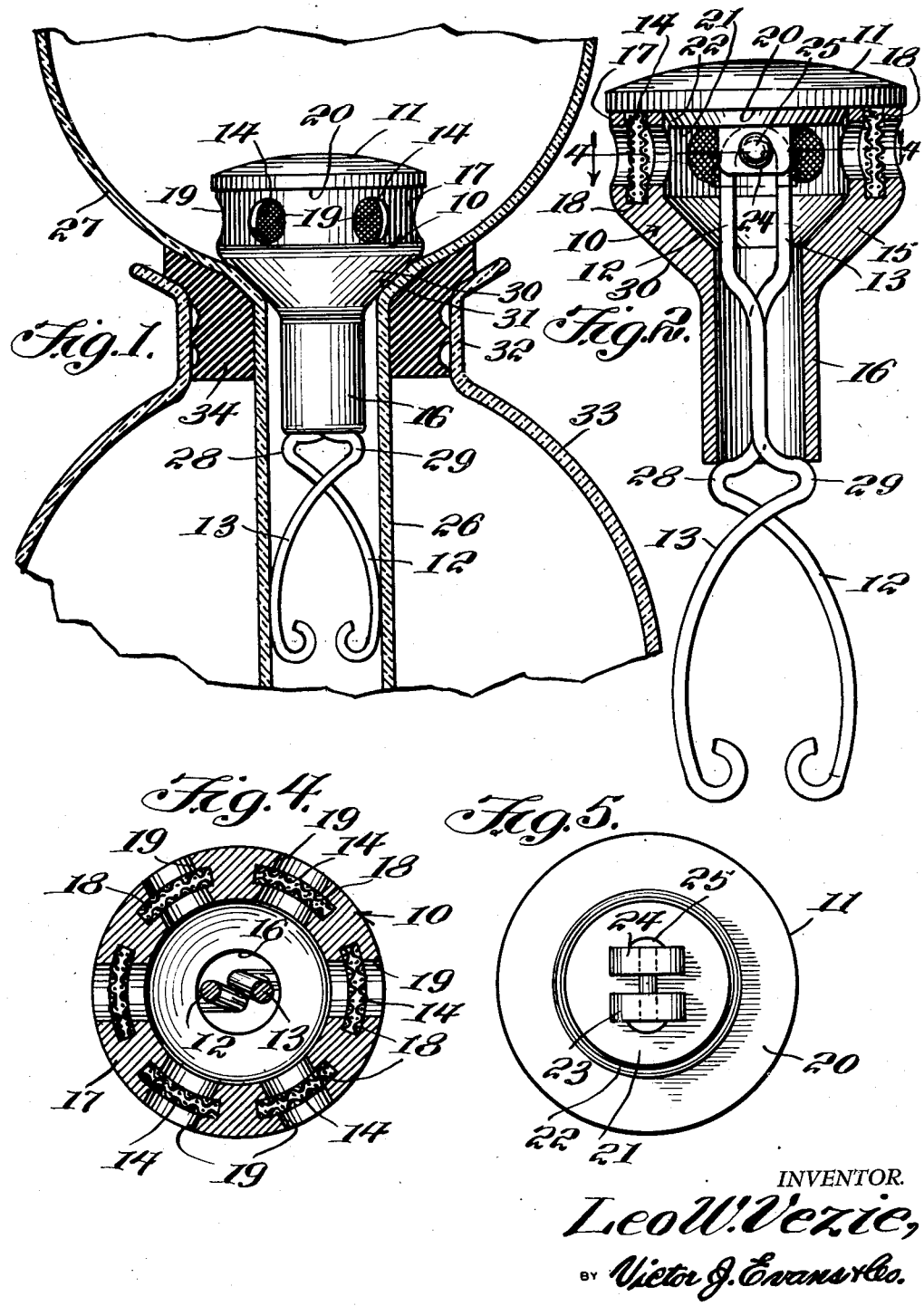
INVENTOR.
Leo W. Vezie,
BY Victor J. Evans & Co.
ATTORNEYS Nov. 18, 1952 — L. W. VEZIE — 2,618,389
SAFETY VALVE FOR COFFEE MAKERS
Filed April 16, 1948 — 2 SHEETS—SHEET 2
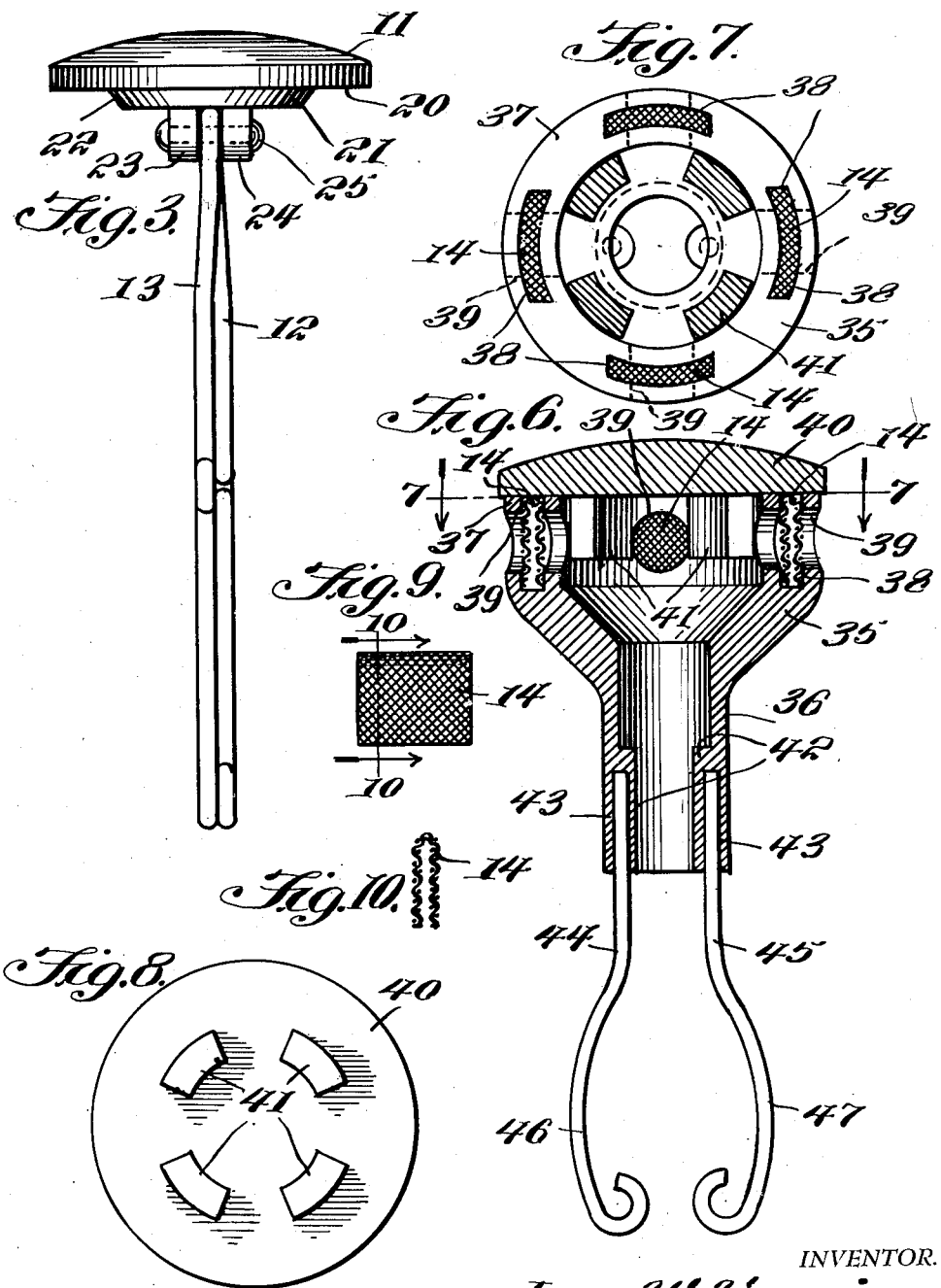
INVENTOR.
Leo W. Vezie,
BY Victor J. Evans & Co.
ATTORNEYS Patented Nov. 18, 1952

2,618,389

UNITED STATES PATENT OFFICE 2,618,389

SAFETY VALVE FOR COFFEE MAKERS

Leo W. Vezie, Phoenix, Ariz.

Application April 16, 1948, Serial No. 21,499

2 Claims. (Cl. 210—162)

This invention relates to coffee makers of the vacuum type wherein water is placed in a lower container and ground coffee is placed in an upper globular container having a neck extending downward into the lower container and as the water is heated the expansion thereof forces it upward into the upper container where it contacts the coffee, and in particular the invention relates to a valve positioned in the upper end of the neck of the upper container for retaining the coffee and controlling the seepage thereof through the coffee as it returns to the lower container when the heat is removed.

The purpose of this invention is to provide a valve for the neck between the upper and lower containers of a coffee maker of the vacuum type that is resiliently held so that when the pressure exceeds a predetermined amount it will release and thereby prevent the lower container exploding by excessive pressure.

In the usual coffee maker of this type the lower container is sealed by a resilient washer around the upper end of the neck extending downward from the upper container, the lower end of the neck being immersed in the water, and should excessive heat be applied to the lower container the pressure will build up faster than the water can pass to the upper container so that explosion occurs. With this thought in mind this invention contemplates a control valve with strainer openings therein that is resiliently retained in the upper end of the neck of the upper container so that it may be forced open by pressure.

The object of this invention is, therefore, to provide a resiliently held valve in combination with the usual filter in the neck of the upper container of a coffee maker of the vacuum type.

Another object of the invention is to provide a combination filter and valve for coffee makers of the vacuum type in which the valve is held by a spring and the spring urges the valve downward or tightens it against a valve seat.

A further object of this invention is to provide an improved combination valve and filter for coffee makers of the vacuum type which is of a simple and economical construction.

With these and other objects and advantages in view the invention consists of the new and novel combination, construction, and arrangement of parts as hereinafter more fully described, set forth in the claims appended hereto, and disclosed in the accompanying drawings forming part hereof, wherein:

Figure 1 is a view showing a side elevation of the device illustrating its use in a coffee maker with the upper and lower parts of the containers of the coffee maker broken away and with parts in section.

Figure 2 is a vertical section through the combination valve and filter.

Figure 3 is a view showing a side elevation of the valve member with the spring depending therefrom and with other parts omitted.

Figure 4 is a sectional plan through the valve and filter taken on line 4—4 of Figure 2.

Figure 5 is a view looking upward toward the under surface of the valve.

Figure 6 is a vertical section through a valve and filter similar to that shown in Figure 2 showing a modification wherein the spring elements are mounted in the base member of the valve.

Figure 7 is a sectional plan taken on line 7—7 of Figure 6.

Figure 8 is a view looking upward toward the under surface of the valve shown in Figure 6.

Figure 9 is a detail showing one of the screen units used in the device.

Figure 10 is a cross section through one of the filtering units or screens, taken on line 10—10 of Figure 9.

Referring now to the drawings wherein like reference characters denote corresponding parts the combination valve and filter of this invention includes a valve body 10, a valve 11, a spring having arms 12 and 13, and an inverted U-shaped screen 14.

The body 10 is formed with a conical-shaped intermediate section 15 having a depending tubular sleeve 16 at the lower end and a cylindrical section or ring 17 at the upper end. The ring 17 is provided with slots 18 that extend downward from the upper surface and radially positioned openings 19 that extend through the slots. The screens 14 are positioned in the slots and provide filtering elements filtering the coffee as it passes downwardly through the device.

The valve 11 is provided with a flat under surface 20 that rests on the upper surface of the ring 17 and the intermediate portion is provided with a raised boss 21 having beveled sides 22 that guide the valve into position. The center of the valve is provided with ears 23 and 24 between which the upper end of the spring is held on a pin 25, and with the valve in position on the body 10 the arms 12 and 13 of the spring extend downwardly through the sleeve 16, and with the lower ends thereof in frictional engagement with the inner surface of a neck 26 of an upper container 27, as shown in Figure 1. The arms 12 and 13 of the spring are bent to form laterally extending shoulders 28 and 29 that snap through the lower end of the sleeve 16 and resiliently urge the valve 11 downward against the seat formed by the upper surface of the ring 17.

The outer conical surface 30 of the body 10 coacts with a correspondingly shaped surface 31 of the upper container 27, and the upper container is sealed in the neck 32 of a lower container 33 by a gasket 34.

In the design shown in Figures 6 to 8 the device is formed with a valve body 35 having a tubular sleeve 36 with a ring 37 similar to the ring 17 of the device shown in Figure 2, and the ring 37 is also provided with slots 38 having radially disposed openings 39 therethrough. In this design the valve 40 is freely positioned on the upper surface of the ring 37 and the under surface thereof is provided with lugs 41 that extend downward into the body, as shown in Figure 6. The lower end of the sleeve 36 of the body 35 is formed with ribs 42 having openings 43 therein in which springs 44 and 45 are mounted, and the springs are provided with outwardly bowed portions 46 and 47 that frictionally engage the inner surface of the neck 26 of the upper container 27.

The screens or filters 14 are inserted in the slots 38, as shown, to filter the coffee as it passes through the valve member from the upper container, dropping into the lower container. Mounting the filter members in upright positions facilitates draining off the coffee so that it passes back into the lower container in less time than with the usual type of filter.

With the parts arranged in this manner the coffee maker may be used with absolute safety as the pressure will open the valve and relieve the pressure before exploding the lower container.

It will be understood that other modifications may be made in the design and arrangement of the parts without departing from the spirit of the invention.

What is claimed is:

1. In a vacuum type coffee maker valve, the combination which comprises a substantially conical shaped valve body having a depending sleeve and an upwardly extended ring with screened openings therethrough, a disc providing a valve having centrally disposed depending lugs on the under surface positioned on the upper surface of the ring of the valve body, a horizontally disposed pin extended through the said lugs depending from the valve, and a spring having depending outwardly bowed arms extended through the said valve body, said spring having a U-shaped upper end extended over the said pin in the lugs for attaching the spring through the upper end thereof to the depending lugs of the disc, and said depending arms of the spring having means frictionally engaging the lower end of the depending sleeve of the valve body for retaining the valve against the upper end of the valve body and means resiliently retaining the said valve body and valve in a depending sleeve of an upper container of a coffee maker.

2. In a vacuum type coffee maker valve, the combination which comprises a substantially conical shaped valve body having a depending sleeve and an upwardly extended ring with screened openings therethrough, a disc providing a valve having centrally disposed depending lugs on the under surface positioned on the upper surface of the ring of the valve body, a spring having depending outwardly bowed arms extended through the said valve body, and means attaching the spring through the upper end thereof to the depending lugs of the disc, said depending arms of the spring having outwardly extended shoulders for engaging the lower end of the depending sleeve of the valve body to retain the valve against the upper end of the valve body and the said outwardly bowed sections of the arms of the spring being extended below the lower end of the depending sleeve of the valve body for engagement with the inner surface of a sleeve of an upper section of a coffee maker for retaining the valve and valve body in the said sleeve of the upper section of the coffee maker.

LEO W. VEZIE.

REFERENCES CITED

The following references are of record in the file of this patent:

UNITED STATES PATENTS

| Number | Name | Date |
| --- | --- | --- |
| 938,605 | Nelson | Nov. 2, 1909 |
| 977,414 | Mathis | Nov. 29, 1910 |
| 2,005,954 | Petersen | June 25, 1935 |
| 2,279,666 | Etnyre | Apr. 14, 1942 |
| 2,301,724 | Vischer | Nov. 10, 1942 |
| 2,376,410 | Wolper | May 22, 1945 |
| 2,386,433 | Carter | Oct. 9, 1945 |
| 2,390,269 | Petersen | Dec. 4, 1945 |
| 2,392,656 | Foster | Jan. 8, 1946 |
| 2,452,881 | Vezie | Nov. 2, 1948 |

FOREIGN PATENTS

| Number | Country | Date |
| --- | --- | --- |
| 821,644 | France | Aug. 30, 1937 |